United States Patent [19]

Dil et al.

[11] 4,230,915
[45] Oct. 28, 1980

[54] RECORD CARRIER WITH AN OPTICALLY READABLE RADIATION-REFLECTING INFORMATION STRUCTURE

[75] Inventors: Jan G. Dil; Bernardus A. J. Jacobs, both of Eindhoven, Netherlands

[73] Assignee: U.S. Philips Corporation, New York, N.Y.

[21] Appl. No.: 972,754

[22] Filed: Dec. 26, 1978

[30] Foreign Application Priority Data

Sep. 11, 1978 [NL] Netherlands ............... 7809227

[51] Int. Cl.² ................................ G11B 7/24
[52] U.S. Cl. ............................... 179/100.1 G
[58] Field of Search ........... 179/100.3 V, 100.3 Z, 179/100.1 G; 358/127, 128; 365/121, 126, 127

[56] References Cited

U.S. PATENT DOCUMENTS

| | | | |
|---|---|---|---|
| 4,020,278 | 4/1977 | Carre et al. | 179/100.3 V |
| 4,041,530 | 8/1977 | Kramer et al. | 179/100.3 V |
| 4,059,841 | 11/1977 | Bricot et al. | 358/128 |
| 4,118,734 | 10/1978 | Bouwhuis et al. | 358/128 |

FOREIGN PATENT DOCUMENTS 2524473  12/1976  Fed. Rep. of Germany ... 179/100.1 G

Primary Examiner—John H. Wolff
Assistant Examiner—Donald McElheny, Jr.
Attorney, Agent, or Firm—Thomas A. Briody; William J. Streeter; Algy Tamoshunas

[57] ABSTRACT

A record carrier is described having an optically readable radiation-reflecting information structure, which comprises trackwise arranged information areas which, in the track direction and transverse to the track direction, are spaced from each other by intermediate areas. It is demonstrated that if the angle of inclination between the walls of the first areas and the normal to the record carrier has one value between 30° and 65° for a satisfactorily reproducible record carrier, the geometrical distance between the plane of the information areas and the plane of the intermediate areas should have one value between (165/N) nanometers and (270/N) nanometers, N being the refractive index of a transparent medium which is disposed between the first and the second plane.

4 Claims, 7 Drawing Figures

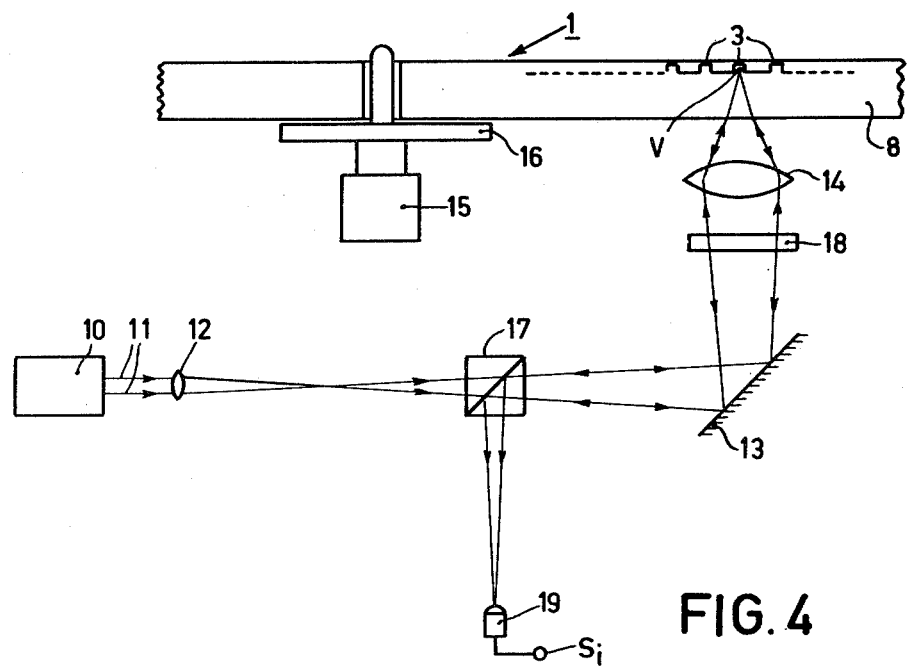
FIG. 4
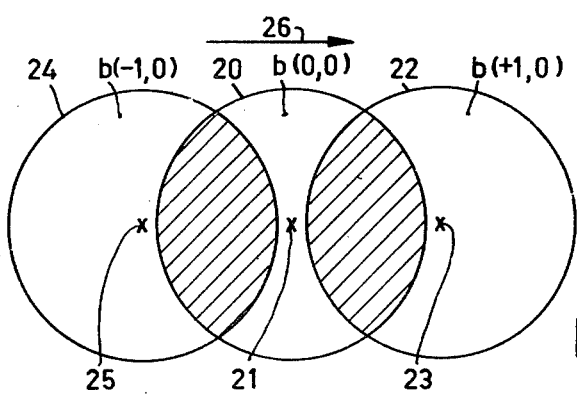
FIG. 5
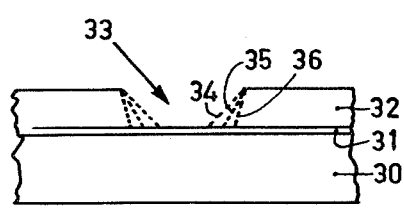
FIG. 6
| θ | do | dg |
|---|---|---|
| 30° | 0,27 λ | 114 n.m. |
| 50° | 0,32 λ | 135 n.m. |
| 60° | 0,41 λ | 173 n.m. |
FIG. 7

RECORD CARRIER WITH AN OPTICALLY READABLE RADIATION-REFLECTING INFORMATION STRUCTURE

SUMMARY OF THE INVENTION

The invention relates to a record carrier in which information is stored in a radiation-reflecting information structure which is readable with an optical radiation beam and which comprises trackwise arranged information areas which, in the track direction and transverse to the track direction, are spaced from each other by intermediate areas, the surfaces of the information areas being disposed substantially in a first plane, the surfaces of the intermediate areas substantially in a second plane, and the distance between the first and the second plane being substantially constant over the entire record carrier.

In the case of a round disk-shaped record carrier the information tracks may comprise a multitude of concentric tracks, but alternatively may be a multitude of quasi-concentric and contiguous tracks which together constitute a spiral track.

U.S. Pat. No. 4,041,530 describes such a record carrier as a medium for the dissemination of a color television program. The information structure is read with a radiation beam, which is focussed to a read spot of the order of magnitude of the information areas by an objective system. The objective system concentrates the read beam which has been reflected and modulated by the information structure on a radiation-sensitive detector. The information structure may be regarded as an amplitude-weighted phase structure, which means that during reading of said structure the phase difference between the various portions of the read beam coming from the record carrier varies depending on the part of the information structure being read instantaneously. At the location of the detector the various beam portions interfere with each other, so that the intensity of the radiation received by the detector and thus the output signal of the detector varies depending on the part of the information structure being read instantaneously.

For a maximum modulation of the output signal of the detector the distance between the surface of the information areas and the surface of the intermediate areas should have a specific value. In accordance with U.S. Pat. No. 4,041,530 this distance should be a quarter of the wavelength of the read radiation. The part of the read radiation reflected by an information area is then required to have a 180° phase difference relative to the part of the read radiation reflected by an intermediate area. The said phase difference is the phase difference measured near the surface of the information structure. This is on the implicit assumption that the information areas have perpendicular walls or, in other words, that the angle of inclination of the walls is 0°. The angle of inclination of the walls is defined as the acute angle between these walls and the normal to the information-carrying surface of the record carrier.

Recently it has been recognized that for an optimum read-out of the information structure it is not so much the phase difference near the information structure, but rather the so-called "phase depth" of this structure which should be approximately 180°. During read out of the information structure this structure is illuminated with a read spot of the order of magnitude of the information areas, and the information structure may be regarded as a diffraction grating, which splits the read beam into a number of spectral orders. To these orders a specific phase and amplitude may be attributed. The "phase depth" is defined as the difference between the zero spectral order and the first spectral order phase.

The Applicant has come to recognize that, apart from by said distance between the information areas and the intermediate areas, phase depth is determined by:
the effective wavelength of the read beam relative to the effective width of the areas, or the effective width of the tracks,
the state of polarization of the read beam, and
the angle of inclination of the walls of the areas.

The effective wavelength is the wavelength close to the information structure and outside the radiation reflecting layer. If the information structure is covered with a transparent protective layer, the effective wavelength is equal to the wavelength in vacuum divided by the refractive index of the protective layer. The effective width of an area is the average width, i.e. if the walls have a constant slope, the width at half the depth of a pit or the width at half the height of a hill.

In practice it has been found that for optically inscribing information in the so-called "master" in a well controlled manner and for copying said master in a reproducible manner, an angle of inclination should be adopted which substantially differs from 0°.

Should the angle of inclination remain smaller than approximately 25°, the phase depth would vary little as a function of the angle of inclination, and a phase depth of 180° would approximately correspond to the phase difference of 180° for steep walls as defined in U.S. Pat. No. 4,041,530. For angles of inclination up from approximately 30°, which are of practical significance, the magnitude of the angle of inclination will have an appreciable effect on the phase depth if the effective wavelength is of the same order of magnitude or smaller than the effective width of the areas. Generally, the distance of $\lambda/4$ between the surface of the information areas and the surface of the intermediate areas will no longer be optimum for these angles of inclination.

The principal radiation source which is now in use for reading a record carrier with an optical information structure is the helium-neon gas laser having a wavelength, in vacuum, of 633 nm. In addition, AlGaAs semiconductor diode lasers with a wavelength in the range of approximately 780 nm to approximately 860 nm are more and more used for this read method.

It is an object of the present invention to provide a record carrier of which the walls of the information structure have a considerable angle of inclination, which can be read in an optimum manner with the aid of those types of radiation sources which are used most frequently in practice.

The record carrier in accordance with the invention is characterized in that the angle of inclination between the walls of the information areas and a normal to the record carrier has one value between 30° and 65°, and that the geometrical distance between the first and the second plane has one value between (165/N) nanometers and (270/N) nonometers, N being the refractive index of a transparent medium which is disposed between the first and the second plane.

If said record carrier, which has a specific effective width of the areas, is intended to be read with a radiation beam with a specific state of polarization whose effective wavelength is smaller than the effective width of the areas, one specific value of the angle of inclination is associated with one specific value for the geometrical distance in the range from (165/n) nm to (270/n) nm; the geometrical distance increases as the angle of inclination increases. An example of this is a helium-neon laser for reading an information structure in which the maximum width of an area is of the order of 625 nm.

In a record carrier in accordance with the invention which is intended to be read with circularly polarized radiation having a wavelength of the order of 633 manometers, the angle of inclination is preferably of the order of 45°–50° and the geometrical distance of the order of (200/N) nanometers.

This embodiment of the record carrier is also extremely suitable to be read with a radiation beam produced by a semiconductor diode laser of the AlGaAs type. At a value of the order of 625 nm for the maximum width of the areas the effective wavelength is then greater than the effective width of the areas. The state of polarization of the read beam then also determines the phase depth. However, the influence of the angle of inclination on the phase depth is then small: the angle of inclination may then have an arbitrary value between approximately 30° and 60°, provided that the angle of inclination is constant over the entire record carrier area.

The values specified for the angles of inclination apply to the radial transitions between the information areas and the intermediate areas, or in more general terms to the transitions in the direction transverse to the track direction. The angle of inclination of the transitions in the track direction are of the same order of magnitude.

The value of (200/N) nm specified for the geometrical distance in the case of reading with the radiation from an AlGaAs laser is the most favorable value, if this radiation is polarized perpendicularly, i.e. if the electric field vector is perpendicular to the longitudinal direction of the information areas. However, the geometrical distance may vary between (200/N) nm and (235/N) nm, while maintaining a satisfactory reading.

BRIEF DESCRIPTION OF THE DRAWINGS

The invention will now be described in more detail with reference to the drawing.

In the drawing:

FIG. 4 shows a known apparatus for reading a record carrier, FIG. 5 shows cross-sections of the zero-order subbeam and of two first-order subbeams in the far field of information structure, FIG. 6 shows the variation of the angle of inclination as a function of the developing time during manufacture of the record carriers, and FIG. 7 is a table giving some values for the angle of inclination and the associated values of the optical distance and of the geometrical distance between the first and the second plane.

DETAILED DESCRIPTION OF THE PREFERRED EMBODIMENTS

Figure 1:
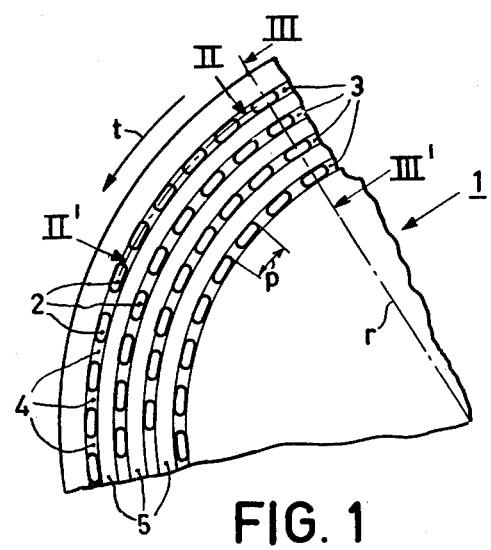
FIG. 1 shows a part of the information structure of a record carrier.

As is shown in FIG. 1, the information structure comprises a plurality of information areas 2 which are arranged in accordance with tracks 3. In the track direction or tangential direction t, and in the radial direction r the areas 2 are spaced from each other by intermediate areas 4. The intermediate areas 4 between the tracks 3 pass into each other and form continuous intermediate strips 5. The areas 4 in the tracks 3 are integral with the intermediate strips 5. The information areas 2 may comprise pits which are pressed into the surface of the record carrier, or of hills which project from the record carrier surface. In principle the distance between the bottom of the pits, or the top of the hills, and the surface of the record carrier is constant, and so is the width of the information areas 2 at the location of the record carrier surface. Said distance and said width are independent of the information stored in the structure.

The information to be disseminated by means of the record carrier is contained in the variation of the structure of areas in the tangential direction only. If a color television program is stored in the record carrier, the luminance signal may be encoded in the variation of the spatial frequency of the information areas 2 and the chrominance and sound signal in the variation of the lengths of the areas 2. The record carrier may also contain digital information. A specific combination of information areas 2 and intermediate areas 4 then represents a specific combination of digital ones and zeros.

The record carrier can be read with an apparatus which is schematically shown in FIG. 4. A monochromatic and linearly polarized beam 11 which is emitted by a gas laser 10, for example a helium-neon laser, is reflected to an objective system 14 by a mirror 13. In the path of the radiation beam 11 an auxiliary lens 12 is included which ensures that the pupil of the objective system 14 is filled. A diffraction limited read spot V is then formed on the information structure. The information structure is schematically represented by the tracks 3; the record carrier is consequently shown in radial cross-section.

The information structure may be disposed on that side of the record carrier which faces the laser. However, preferably, as is shown in FIG. 4, the information structure is disposed on that side of the record carrier which is remote from the laser, so that reading is effected through the transparent substrate 8 of the record carrier. The advantage of this is that the information structure is then protected against fingerprints, dust particles and scratches.

The read beam 11 is reflected by the information structure and, as the record carrier is rotated by means of a platter 16 which is driven by a motor 15, is modulated in accordance with the sequence of the information areas 2 and the intermediate areas 4 in a track being read. The modulated read beam again passes through the objective system 14 and is reflected by the mirror 13. In order to separate the modulated read beam from the unmodulated read beam the radiation path preferably includes a polarization-sensitive splitter prism 17 and a $\lambda_o/4$ plate 18, where $\lambda_o$ represents the wavelength of the read beam in free space. The prism 17 transmits the beam 11 to the $\lambda_o/4$ plate 18, which converts the linearly polarized radiation into circularly polarized radiation which is incident on the information structure. The reflected read beam again traverses the $\lambda_o/4$ plate 18, the circularly polarized radiation being converted into linearly polarized radiation whose plane of polarization is rotated through 90° relative to the radiation emitted by the laser 10. As a result of this the prism 17 will reflect the read beam to the radiation-sensitive detector 19 during the second passage. At the output of this detector an electrical signal $S_i$ is produced which is modulated in accordance with the information being read.

The information structure is illuminated with a read spot V, whose dimension is of the order of magnitude of that of the information areas 2. The information structure may be regarded as a diffraction grating which splits the read beam into a non-diffracted zero-order subbeam, a number of first-order subbeams and a number of subbeams of higher spectral orders. Mainly the subbeams which are diffracted in the track direction are of significance for reading, and of these beams mainly the subbeams which are diffracted in the first orders. The numerical aperture of the objective system and the wave length of the read beam are adapted to the information structure in such a way that the higher order subbeams for the greater part fall outside the pupil of the objective system and do not reach the detector. Moreover, the amplitudes of the higher-order subbeams are low relative to the amplitudes of the zero-order subbeams and the first-order subbeams.

FIG. 5 shows the cross-section in the plane of the exit pupil of the objective system of the first-order subbeams, which have been diffracted in the track direction. The circle 20 with the center 21 represents the exit pupil. This circle also gives the cross-section of the zero-order beam b(0,0). The circles 22 and 24 with the centers 23 and 25 respectively represent the cross-section of the first-order subbeam b(+1,0) and b(−1,0) respectively. The arrow 26 represents the track direction. The distance between the center 21 of the zero-order subbeam and the centers 23 and 25 of the first order subbeams is determined by $(\lambda_o/p)$, where p (see FIG. 1) represents the spatial period of the areas 2 at the location of the read spot V.

In the present description of the read process it may be assumed that in the areas which are shown hatched in FIG. 5 the first-order subbeams overlap the zero order subbeam and that interference occurs. The phases of the first-order subbeams vary if the read spot moves relative to an information track. As a result of this the intensity of the total radiation passing through the exit pupil of the objective system varies.

When the center of the read spot coincides with the center of an information area 2, there will be a specific phase difference $\psi$, referred to as the phase depth, between a first-order subbeam and the zero-order subbeam. If the read spot moves to a subsequent area, the phase of the subbeam b(+1,0) increases by $2\pi$. It is therefore correct to assume that when the read beam moves in the tangential direction the phase of said subbeam varies with $\omega t$ relative to the zero-order subbeam. Herein $\omega$ is a time frequency which is determined by the spatial frequency of the information areas 2 and by the speed with which the read spot moves over a track. The phase $\phi(+1,0)$ and $\phi(-1,0)$ of the subbeam b(+1,0) and of the subbeam b(−1,0) respectively relative to the zero-order subbeam b(0,0) may be represented by:

$\phi(+1,0) = \psi + \omega t$ and $\phi(-1,0) = \psi - \omega t$ respectively.

For the read method used here, as is indicated in FIG. 4, the portions of the first-order subbeams passing through the objective system are combined with the zero-order subbeam on one detector 19. The time-dependent output signal of this detector may then be represented by:

$$S_i = A(\psi) \cdot \cos\psi \cdot \cos(\omega t),$$

where $A(\psi)$ decreases at decreasing value of $\psi$. The amplitude $A(\psi) \cdot \cos\psi$ of the signal $S_i$ is now a maximum for a phase depth of $\psi = \pi$ rad.

For the method of reading with a helium-neon laser beam as illustrated in FIG. 4, the information structure being illuminated with circularly polarized radiation and the effective width of the information areas 2 being greater than the effective wavelength, as follows from calculations made by the Applicant and confirmed by experiments, the phase depth is determined by the following parameters:

the wavelength in free space $\lambda_o$ of the read beam, the refractive index N of the transparent medium which is disposed between the plane of the information areas 2 and the plane of the intermediate areas 4, and which moreover covers the information structure, the geometrical distance between these planes, i.e. in the case of a pit structure the geometrical pit depth, and the angle of inclination $\theta$ of the walls of the areas 2.

For the record carrier described, which is for example intended to disseminate a television program in large quantities, it is important that the information be inscribed in a well-defined manner and that starting from an inscribed master a large number of copies, i.e. record carriers to be played back by the consumer, can be manufactured. In practice these requirements result in record carriers in which the walls of the areas 2 have an angle of inclination $\theta$ which substantially deviates from 0°.

As is described in the article "Laser beam recording of video master disks in Applied Optics" vol. 17, No. 13, pages 2001–2006, the information is recorded by exposing a photoresist layer provided on a substrate with a laser beam whose intensity is modulated in accordance with the information to be recorded. After recording the photoresist is developed, resulting in a pit structure or a hill structure. The photoresist is then completely removed at the location of the pits or between the hills, so that the thickness of the photoresist layer determines the depth of the pits or the height of the hills in the final record carrier.

The final record carrier will have already oblique walls, because of the intensity distribution of the write beam which is used. The developing process also influences the wall steepness: the wall steepness increases as the developing time increases. In FIG. 6 this is illustrated for a structure of pits 33. In this Figure the substrate of the master is designated 30 and 31 is an intermediate layer which ensures a correct adhesion of the photoresist layer 32 to the substrate. The dashed lines 34, 35 and 36 respectively represent the wall steepness in the case of developing for short time, a longer time and a still longer time respectively.

From the developed master so-called mother discs are made in known manner, and from these in turn matrixes. By means of the matrixes a large number of record carriers are made. In order to facilitate separation of the copies from the matrix, the angle of inclination of the walls should preferably be as large as possible. Therefore, as a result of the method of recording and copying, the angle of inclination should have a specific value, which deviates from zero degrees.

In the manufacture of a record carrier which is adapted to be read with a He-Ne beam or with a beam of comparable wavelength, the effective width of the areas 2 being greater than the effective wavelength, the negative effect on the phase depth of the large angle of inclination, which in itself is desirable, is compensated for by increasing the geometrical distance between the surface of the information areas 2 and the surface of intermediate areas 4, for example by making the photoresist layer thicker.

Figure 2:
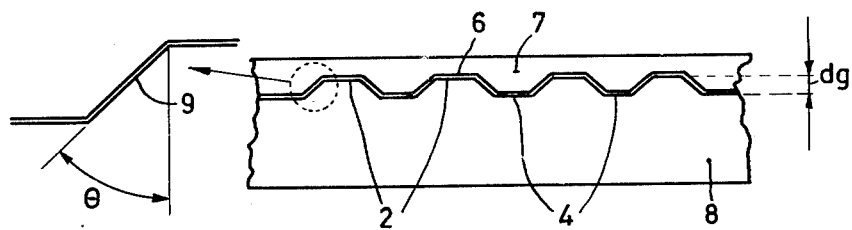
FIG. 2 shows a part of a tangential crosssection of a preferred embodiment of a record carrier in accordance with the invention.
Figure 3:
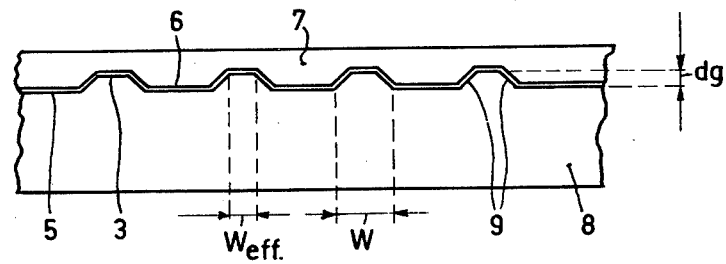
FIG. 3 shows a part of a radial cross section of a preferred embodiment of a record carrier in accordance with the invention.

FIG. 2 shows a small part of a preferred embodiment of a record carrier in accordance with the invention in tangential cross-section taken on the line II-II' in FIG. 1, while FIG. 3 shows a part of this record carrier in radial cross-section taken on the line III-III' in FIG. 1. During reading the record carrier is illuminated from the underside, the substrate 8 being used as an optical protective layer. The information structure may be covered with a layer 6 of a highly reflecting material, for example silver or aluminum or titanium. Moreover, a protective layer 7 may be deposited on the layer 6, which protects the information structure against mechanical damage such as scratches.

The inset of FIG. 2 shows the angle of inclination $\theta$ of the walls 9. This angle of inclination is the result of a compromise. It has been found that the write process and the copying process are reproducible in an optimum manner, when the angle of inclination is of the order of 45° to 50°. However, acceptable results can also be obtained with angles of inclination in the range from 30° to 65°.

In FIG. 3 the effective width, $w_{eff}$, of the areas 2 is indicated. The effective width, which is equal to the average width, is determined by the width w in the plane of the intermediate areas 4, the angle of inclination $\theta$ and the geometrical depth $d_g$ of the pits in accordance with:

$$w_{eff} = w - d_g \cdot \tan\theta$$

For an embodiment of a record carrier for which $w = 625$ nm, $\theta = 45°$ and $d_g = 135$ nm, this yields $w_{eff} = 490$ nm.

It is possible that the width w is not the same over the entire record carrier area, but that the width w at the inner area of the record carrier is greater, for example 800 nm, that at the outer area, for example 500 nm. The purpose of this track width variation is then, as is described in the U.S. Pat. No. 4,118,734, to ensure an optimum reading of both the tracks in the center and of the tracks near[3] the periphery by means of a read spot of constant dimension.

For a record carrier which is intended to be read with a He-Ne beam or with a beam of comparable wavelength the optical depth $d_o$ of the pits, or the optical height of the hills, is always greater than $\lambda/4$, while for the previously proposed record carriers always a value of $\lambda/4$ was specified for this depth or height.

The correct value of the optical distance $d_o$ is determined by the angle of inclination $\theta$ of the walls. In the table of FIG. 7 the associated values of the optical distance $d_o$ are given for a few values of the angle of inclination $\theta$. The geometrical distance $d_g$ associated with an optical distance $d_o$ is given by: $d_g = d_o/N$, where N is the refractive index of the transparent material in the pits if the information areas 2 are pits, or of the transparent material between the hills, if the areas are hills. If no transparent protective layer is deposited on the information structure i.e. if the structure is adjoined by air, $N = 1$, and the geometrical distance is equal to the optical distance.

As an example the geometrical distances associated with the values specified for the angle of inclination $\theta$ are given in the extreme right column of FIG. 7 in the case that a record carrier in accordance with FIGS. 2 and 3 with a substrate having a refractive index of 1.5 is read with circularly polarized helium-neon radiation for which $\lambda_o = 633$ nm.

Recently semiconductor diode lasers are also used as a radiation source for reading optical record carriers. In particular diode lasers using the materials aluminium, gallium and arsenic, which lasers emit a wavelength of approximately 780 nm to approximately 860 nm, are suitable for this purpose.

When a AlGaAs diode laser is used, instead of the gas laser assumed in FIG. 4, no steps need be taken in order to prevent the radiation which is reflected by the information structure from being fed back to the laser. On the contrary, during reading effective use can be made of this feedback, as is described in U.S. Pat. No. 3,941,945. This means that in the read apparatus no polarizing means, such as the $\lambda/4$ plate 18 and the prims 17 in FIG. 4, need be used. If the diode laser emits linearly polarized radiation the information structure will be illuminated with linearly polarized radiation without any further steps.

If reading is effected with a diode laser of longer wave-length the requirement that $w_{eff}$ should be greater than $\lambda_{eff}$ is no longer met, unless the width w were increased, which is not advisable in view of the information density. As soon as the effective wave-length is equal to or greater than the effective width, the phenomena occurring during reading of the information structure can no longer be fully described with a scalar diffraction theory, but use will have to be made of a vectorial diffraction theory. The influence of the state of polarization of the read beam on the phase depth then becomes substantial. When a perpendicularly polarized read beam is used an elongate pit or a elongate hill appears to be deeper or higher respectively than when a parallel polarized or circularly polarized read beam is used. This effect is also valid for a read beam for which $\lambda_{eff} < w_{eff}$. A perpendicularly or parallel polarized read beam is to be understood to means a read beam of which the electric field vector, the E-vector, respectively perpendicular or parallel to the longitudinal direction of the pits or hills.

The Applicant has discovered that the record carrier, which is adapted to be read with He-Ne radiation, with a geometrical pit depth, or hill height, of (200/N) nm is also eminently suitable for reading with perpendicularly polarized AlGaAs radiation. Surprisingly, it was found that the influence of the angle of inclination on the phase depth is comparatively small. For a geometrical pit depth of (200/N) nm the angle of inclination may have one arbitrary value between approximately 30° and approximately 60°, without giving rise to a significant deterioration in the quality of the signal read. For the present values of the effective wavelength and of the effective width of the pits, the read beam can no longer discriminate between different angles of inclination.

The value of (200/N) nm for the geometrical distance between the surface of the information areas and the surface of the intermediate areas is an optimum value. Satisfactory reading of a record carrier is also possible when the geometrical distance is greater. The upper limit for this distance is approximately (235/N) nm. A record carrier whose geometrical distance approximates the upper limit need not be read with a perpendicularly polarized read beam, but may also be read with a parallel polarized read beam or a circularly polarized read beam. For any value of the geometrical distance between (200/N) nm and (235/N) nm the angle of inclination $\theta$ may also have one arbitrary value between 30° and 60°.

The invention has been described on the basis of a round disk-shaped record carrier. However, the invention may also be used in conjunction with other record carriers such as record carriers in the form of a tape or cylindrical record carriers.

What is claimed is:

1. An improved record carrier in which information is stored in a radiation-reflecting information structure at least one side of which is readable with an optical radiation beam and which comprises information areas arranged in tracks which areas, in the track direction and transverse to the track direction, are spaced from each other by intermediate areas, the surfaces of the information areas being disposed substantially in a first plane, the surface of the intermediate areas substantially in a second plane, and the distance between the first and the second plane being substantially constant over the entire record carrier, the improvement being charcterized in that the angle of inclination between the walls of the information areas and a normal to the record carrier has one value between 30° and 65°, and the geometric distance between the first and the second plane has one value between 165/N and 270/N nanometers, N being the refractive index of a transparent medium which is disposed between the first and the second plane on the optically readable side of the information structure.

2. An improved record carrier as claimed in claim 1, adapted to be read either with circularly polarized radiation having a wavelength of the order of 633 nm, or with linearly polarized radiation having a wavelength in the range from 780 nm to 860 nm, and having a direction of polarization perpendicular to the track direction, the improvement being characterized in that the angle of inclination is of the order of 45° to 50° and the geometrical distance of the order of (200/N) nanometers.

3. An improved record carrier as claimed in claim 1, adapted to be read with circularly polarized radiation having a wavelength in the range from 780 nm to 860 nm, the improvement being characterized in that the angle of inclination is of the order of 45° to 50° and the geometrical distance has one value between (210/N) nm. and (225/N) nm.

4. An improved record carrier as claimed in claim 1, of the round disk-shaped type, the improvement being characterized in that the starting from the periphery, the width of the information areas measured radially increases gradually and independently of the information.

* * * * *